(12) United States Patent
Foti et al.

(10) Patent No.: US 10,077,209 B2
(45) Date of Patent: Sep. 18, 2018

(54) GLAZING UNIT COMPRISING A HYDROPHILIC LAYER HAVING AN IMPROVED SCRATCH RESISTANCE

(71) Applicants: SAINT-GOBAIN GLASS FRANCE, Courbevoie (FR); UNIVERSITE PIERRE ET MARIE CURIE, Paris (FR); CENTRE NATIONAL DE LA RECHERCHE SCIENTIFIQUE, Paris (FR)

(72) Inventors: Fabio Foti, Paris (FR); Alix Arnaud, Montrouge (FR); Laurent Bouteiller, Bourg la Reine (FR); Julien Bonnet, Saint Sébastien sur Loire (FR)

(73) Assignees: SAINT-GOBAIN GLASS FRANCE, Courbevoie (FR); SORBONNE UNIVERSITE, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/101,259

(22) PCT Filed: Dec. 1, 2014

(86) PCT No.: PCT/FR2014/053093
§ 371 (c)(1),
(2) Date: Jun. 2, 2016

(87) PCT Pub. No.: WO2015/082814
PCT Pub. Date: Jun. 11, 2015

(65) Prior Publication Data
US 2016/0304394 A1 Oct. 20, 2016

(30) Foreign Application Priority Data

Dec. 3, 2013 (FR) ..................................... 13 61999
Jul. 17, 2014 (FR) ..................................... 14 56851

(51) Int. Cl.
*C03C 17/32* (2006.01)
*C03C 17/00* (2006.01)
*C03C 17/30* (2006.01)

(52) U.S. Cl.
CPC .......... *C03C 17/322* (2013.01); *C03C 17/001* (2013.01); *C03C 17/30* (2013.01); *C03C 2217/29* (2013.01); *C03C 2217/75* (2013.01); *C03C 2217/78* (2013.01)

(58) Field of Classification Search
CPC ..... C03C 17/001; C03C 17/30; C03C 17/322; C03C 2217/29; C03C 2217/75; C03C 2217/78
USPC ....... 428/34, 423.1, 425.6; 312/116; 528/59, 528/60, 65; 427/372.2
See application file for complete search history.

(56) References Cited

U.S. PATENT DOCUMENTS

| | | | |
|---|---|---|---|
| 3,663,516 A * | 5/1972 | Vogt | C07C 273/1854 528/58 |
| 3,711,443 A * | 1/1973 | Thoma et al. | C08G 18/10 525/403 |
| 4,211,804 A * | 7/1980 | Brizzolara | C08G 18/721 252/182.22 |
| 4,467,073 A | 8/1984 | Creasy | |
| 2004/0137155 A1 | 7/2004 | Bernheim et al. | |
| 2012/0201982 A1 | 8/2012 | Stewart et al. | |

FOREIGN PATENT DOCUMENTS

WO   WO 2013/026612 A1   2/2013

OTHER PUBLICATIONS

International Search Report as issued in International Patent Application No. PCT/FR2014/053093, dated Mar. 16, 2015.

\* cited by examiner

*Primary Examiner* — Thao T Tran
(74) *Attorney, Agent, or Firm* — Pillsbury Winthrop Shaw Pittman LLP

(57) ABSTRACT

A glazing unit includes a hydrophilic layer including a polyurethane network incorporating bis-urea functions. Furthermore, a process for manufacturing this glazing unit, includes depositing a solution containing at least one isocyanate, one polyol and one bis-urea including a polyol function, polyvinylpyrrolidone, a film-forming agent and a solvent on a glass substrate, drying the glazing unit containing the substrate and the deposited solution, and subjecting the glazing unit to a temperature of between 100 and 150° C.

22 Claims, 2 Drawing Sheets

GLAZING UNIT COMPRISING A HYDROPHILIC LAYER HAVING AN IMPROVED SCRATCH RESISTANCE

CROSS-REFERENCE TO RELATED APPLICATIONS

This application is the U.S. National Stage of PCT/FR2014/053093, filed Dec. 1, 2014, which in turn claims priority to French Application No. 1361999, filed Dec. 3,2013 and French Application No. 1456851, filed Jul. 17, 2014. The contents of all of these applications are incorporated herein b reference in their entirety.

The present invention relates to a glazing unit with a hydrophilic layer, to a process for the manufacture thereof, and to the use thereof.

The visibility through glazing units in transportation vehicles may be impaired when condensation occurs. Known solutions for avoiding or eliminating fogging consist in increasing the ventilation or in using heated glazing units. In order to conserve the battery of electric vehicles, in particular, a passive solution is preferable.

Document WO 2013/026612 A1 describes a glazing unit comprising a substrate coated with a hydrophilic layer containing at least polyurethane, polyvinylpyrrolidone and a film-forming agent. This glazing unit delays and limits the formation of condensation in the form of droplets affecting visibility. The condensation has, on the contrary, a tendency to be deposited thereon in the form of a uniform film of water not affecting visibility.

Scratches on the glazing unit, and in particular on the hydrophilic layer, are, other than condensation, one of the main other phenomena which can impair visibility through the glazing unit. The invention has thus aimed to improve the scratch resistance of this type of glazing unit, and in particular of this type of hydrophilic layer.

This objective is achieved by the invention, of which the subject is consequently a glazing unit comprising a hydrophilic layer with a polyurethane network incorporating bis-urea functions.

For the purposes of the invention, the term "incorporating" signifies: by covalent bonding.

The bis-urea functions generate additional physical cross-linking by hydrogen bonding between two hydrogen atoms each connected to a nitrogen atom via a single bond and an oxygen atom of a neighboring molecule, connected to a carbon atom via a double bond. For the purposes of the invention, a glazing unit denotes a structure comprising a transparent substrate made of glass material such as glass, glass-ceramic, a siliceous compound such as polysiloxane, of crystalline oxide of the alumina type (sapphire), etc., or of transparent polymer material resistant to the temperatures for producing the hydrophilic layer, in particular 150° C. Mention may be made of a polycarbonate, a poly(methyl methacrylate), an ionomer resin, a polyamide, a polyester such as poly(ethylene terephthalate), a polyolefin, etc. The transparent substrate may constitute a rigid sheet or a flexible film.

The glazing unit of the invention may be monolithic, but the hydrophilic layer may also coat a transparent substrate which is part of a laminated or multiple (double, triple, etc.) glazing unit.

According to other preferred characteristics of the glazing unit of the invention:

the hydrophilic layer contains polyvinylpyrrolidone; the molecular chains, which are for example essentially linear polyvinylpyrrolidone chains, can be entangled in the polyurethane network without being bonded thereto by covalent bonding, for example by formation of said network in the presence of polyvinylpyrrolidone;

the hydrophilic layer contains a film-forming agent, which advantageously contains at least one polydimethylsiloxane, preferably modified with a polyester, in particular comprising a hydroxyl function;

the hydrophilic layer contains at least 75% to 99% by weight of polyurethane, 1% to 15% by weight of polyvinylpyrrolidone, and 0.01% to 3% by weight of film-forming agent;

the weight-average molecular weight of the polyvinylpyrrolidone is from $1.1 \times 10^6$ to $1.8 \times 10^6$ g/mol;

the hydrophilic layer has a thickness of between 0.1 and 250 µm, preferably 1 and 100 µm, and particularly preferably 3 and 50 µm; and the hydrophilic layer is connected to a glass substrate with interposition of an adhesion primer which contains at least one aminosilane (see definition of a glass material above).

A subject of the invention is, furthermore, a process for manufacturing a glazing unit comprising a hydrophilic layer as previously described, wherein:

a) a solution containing at least one isocyanate, one polyol and one bis-urea comprising a polyol function, polyvinylpyrrolidone, a film-forming agent and a solvent is deposited on a glass substrate, b) the glazing unit containing the substrate and the deposited solution is dried, and c) subjected to a temperature of between 100 and 150° C.

The isocyanate (polyisocyanate, triisocyanate and/or diisocyanate) reacts with the polyol as with the polyol function of the bis-urea, which is thus incorporated into the polyurethane network.

According to preferred characteristics of the process of the invention:

the hydroxyl functions of the bis-urea represent 1 to 25, preferably 3 to 22 mol % of the hydroxyl functions of all the polyols;

the isocyanate is chosen from hexamethylene-1,6-diisocyanate, an oligomer or a homopolymer thereof, and a cyclic aliphatic diisocyanate, alone or as a mixture of several of them;

the polyol is chosen from polyethylene glycols, polypropylene ether polyol and 1,4-butanediol, alone or as a mixture of several of them;

the solution contains a catalyst, preferably dibutyltin dilaurate;

the solution has an [NCO]/[OH] molar ratio of between 0.7 and 1.3, preferably 0.8 and 1.15.

Another subject of the invention consists of the use of a glazing unit comprising a hydrophilic layer as described above, for a terrestrial, airborne or aquatic transportation vehicle, in particular for an electric vehicle or other motor vehicle, for example as a windshield, rear window, side glazing unit or roof glazing unit, for construction, interior fittings, mirrors, electrical goods, and street furniture, in particular with the aim of reducing the condensation of moisture on the glazing unit.

Figure 1:
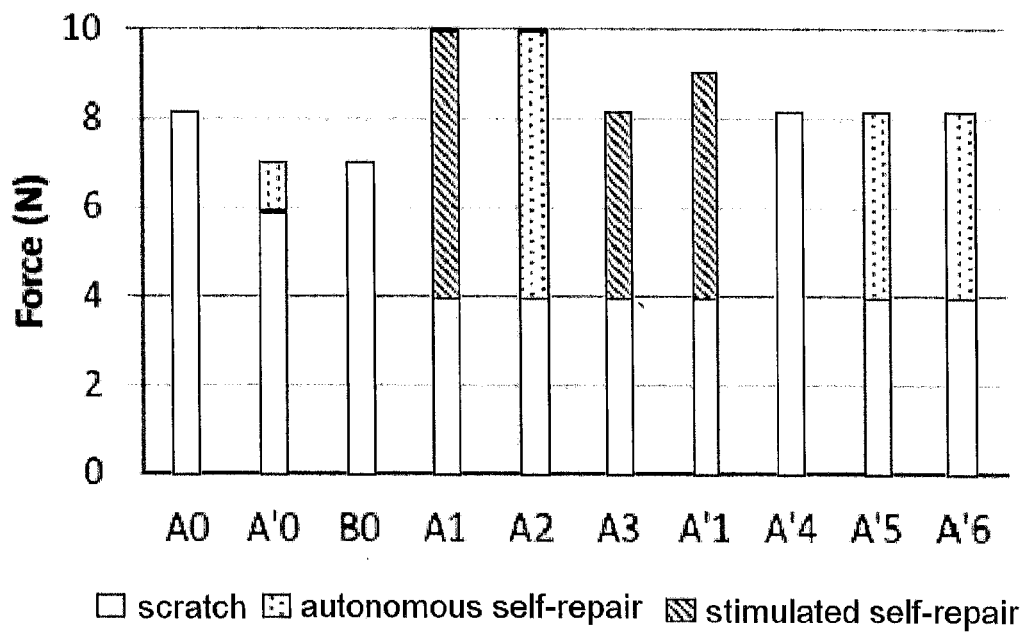
FIG. 1 shows the scratch resistance of layers under dry conditions according to an embodiment of the invention.

The invention is now illustrated by the following example.

EXAMPLE

Chemical Products

The isocyanates used in the formulation of the polyurethane network were provided by the company Bayer. Desmodur® N3200 is a trifunctional isocyanate with a molar mass of 480 g.mol$^{-1}$. It is based on the biuret structure of hexamethylene diisocyanate. Desmodur W is a cyclic aliphatic diisocyanate with a molar mass of 262 g.mol$^{-1}$. Their formulae are represented schematically below.

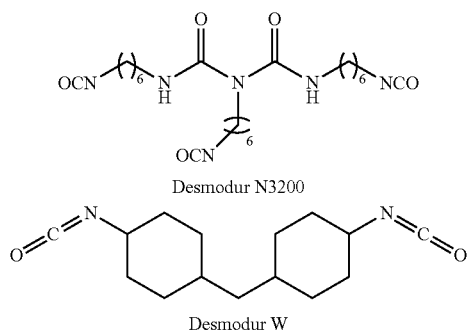

Desmodur N3200

Desmodur W

The isocyanates were stored under an inert atmosphere. The NCO groups were quantitatively determined by acid/base titration according to standard NF EN ISO 14896.

The polyol used is a polyethylene glycol (PEG) of 200 g.mol$^{-1}$. The PEG and also the dibutyltin dilaurate (DBTL) used as catalyst of the reaction are commercial products from Aldrich.

The film-forming agent consisting of polydimethylsiloxane modified with a polyester and comprising a hydroxyl function is BYK-370 and was provided by the company BYK-Chemie GmbH.

The polyvinylpyrrolidone (PVP), which acts as the antifogging agent, is distributed by BASF under the brand name Luvitec® K90.

Finally, the formulation solvent, diacetone alcohol (DAA), comes from VWR.

Synthesis of the Bis-Urea Compounds

Bis-urea compounds are monomers comprising two urea functions, arranged around an aromatic core and bonded to alkyl side chains. The alkyl side chains were hydroxyl-functionalized for the purpose of incorporating them into the polyurethane network.

The synthesis is carried out in a single step by condensation between a diisocyanate and an amino alcohol in dichloromethane, according to the following reaction scheme.

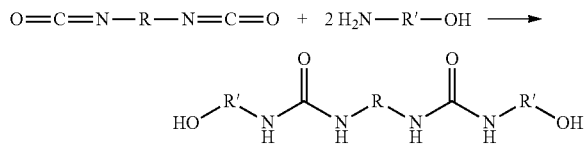

Three bis-urea monomers were synthesized from toluene-2,4-diisocyanate (TDI) on the one hand, 6-amino-1-hexanol, 2-amino-1-butanol and 2-aminopropanol on the other hand, all purchased from Aldrich. The TDI was stored at 4° C. with the aim of preventing side reactions. The dichloromethane was obtained from VWR and distilled and dried before use. The table below indicates the No. assigned to each bis-urea in the rest of the example, the starting products for its synthesis, a schematic representation of its formula and its solubility in DAA.

TABLE 1

Composition of the bis-urea monomers synthesized

| Compound | Diisocyanate | Amino alcohol | Formula | Solubility in DAA (% by wt.) |
|---|---|---|---|---|
| Bis-urea1 (Bis 1) | TDI | 2-amino-propanol | M = 324.38 g · mol$^{-1}$ | 8 |
| Bis-urea4 (Bis 4) | TDI | 6-amino-1-hexanol | M = 408.54 g · mol$^{-1}$ | 7.5 |

TABLE 1-continued

Composition of the bis-urea monomers synthesized

| Compound | Diisocyanate | Amino alcohol | Formula | Solubility in DAA (% by wt.) |
|---|---|---|---|---|
| Bis-urea5 (Bis 5) | TDI | 2-amino-1-butanol | 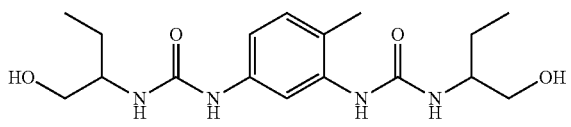 $M = 352.44 \ g \cdot mol^{-1}$ | 2.4 |

A solution of amino alcohol (0.15 mol) in 100 ml of anhydrous $CH_2Cl_2$ was added, under nitrogen and at 0° C., to a solution of TDI (0.07 mol) in 250 ml of anhydrous $CH_2Cl_2$. The white precipitate obtained was then subsequently filtered and then washed with dichloromethane and recovered after evaporating off the solvent under a pronounced vacuum. An NMR spectrum of the final product was finally produced in order to verify the purity of the product.

Formulation

Upstream of the formulation, a stock solution containing 15% by weight of PVP in DAA was prepared by dissolution and stirring.

The formulations were prepared for a solids content of 35% by weight in the solvent.

Control Formulations

The stock solution is weighed in a tablet bottle and then the calculated weight of PEG is introduced with a pipette. The solution is stirred at ambient temperature and the calculated weight of isocyanate is introduced into the mixture. The film-forming agent (BYK-370) and the catalyst (DBTL) are successively added, with the appropriate amount of solvent. The final solution is stirred at ambient temperature.

Formulations with Bis-Urea

The bis-urea compounds synthesized are dissolved at ambient temperature and with stirring in DAA. The weight concentration of bis-urea in the DAA depends on the molar amount of bis-urea that it is desired to introduce into the network. The calculated weights of stock solution, PEG, isocyanate, BYK and DBTL are respectively added to the solution, with stirring between each addition.

The thickness of the wet film deposited on the substrate is 100 μm.

The films formulated were then stored in a closed and ventilated oven.

The solvent was evaporated off at 50° C. and the baking step was carried out at 120° C. The thickness of the film after baking comes to 40 μm. The composition of the main formulations made explicit is reported in the table below.

TABLE 2

| Formulation | Reagents | | | | | |
|---|---|---|---|---|---|---|
| | Desmodur N3200 (mol %) | Desmodur W (mol %) | PEG (mol %) | Bisurea 1 (mol %) | Bisurea 4 (mol %) | Bisurea 5 (mol %) |
| Thickness 40 μm | NCO titration 21 | | | | | |
| Reference A0 | 100 | | 100 | | | |
| A1 | 100 | | 90 | 10 | | |
| A2 | 100 | | 90 | | 10 | |
| A3 | 100 | | 95 | | 5 | |
| Thickness 40 μm | NCO titration 22 | | | | | |
| Reference A'0 | 100 | | 100 | | | |
| A'1 | 100 | | 90 | 10 | | |
| A'4 | 100 | | 85 | 15 | | |
| A'5 | 100 | | 85 | | 15 | |
| A'6 | 100 | | 90 | | | 10 |
| Thickness 40 μm | NCO titration 21 | | | | | |
| Reference B0 | 90 | 10 | 100 | | | |
| B1 | 90 | 10 | 90 | 10 | | |
| B2 | 90 | 10 | 90 | | 10 | |
| Thickness 40 μm | NCO titration 22 | | | | | |
| B'4 | 90 | 10 | 85 | 15 | | |
| B'5 | 90 | 10 | 85 | | 15 | |

In all cases, the thickness of the hydrophilic layer is 40 μm on a dry basis.

The terms "titration 21 (or 22)" indicate a proportion by weight of the triiocyanate and, where appropriate, of the diisocyanate of 21% or 22% in the solution deposited.

Said solution also contains:
0.2% to 7% by weight (3.5% in the example) of polyvinylpyrrolidone, and
0.001% to 1.5% by weight (0.13% in the example) of BYK-370.

The amounts of DBTL used range from 0.001% to 1% by weight (0.01% in the example).

The Reference examples indicate the control formulations free of bis-urea.

The amounts of PEG and bis-urea are such that the concentration of hydroxyl functions is equal to the concentration of isocyanate functions.

The scratch resistance of the layers proves to be an essential parameter for numerous applications. The scratch tests were carried out on a Universal Scratch Test model 413 (Erichsen DIN53799) using a 0.75 mm metal tip of spherical geometry. A gradual load ranging from 1 to 10 N was applied to the layer in order to evaluate the performance level thereof. The scratch resistance of the layer is given by the lowest load which causes a mark visible to the naked eye on the coating.

Two phenomena are observed: autonomous self-repair and stimulated self-repair.

In certain tests, scratches appear starting from a certain applied force in the Erichsen test, but gradually disappear, however, up to a maximum value of this applied force. The range between the scratch appearance force and this maximum value of scratch disappearance is that of the autonomous self-repair.

In other tests, or even in certain cases of autonomous self-repair, the scratches disappear only through 30 seconds of contact with water, removed by wiping for example, after these 30 seconds; this phenomenon is, however, again observed only up to a certain maximum value of the applied force in the Erichsen test, defining the stimulated self-repair range.

The scratch resistance of the layers is first evaluated under dry conditions. The results are recorded in the form of a histogram represented in appended FIG. 1. They concern mainly the layers formed without Desmodur W diisocyanate as starting product.

The bis-urea 1 of A1 provides an increase in scratch resistance by stimulated self-repair (approximately 3 min), compared with A0.

The bis-urea 4 of A2 provides an increase in scratch resistance by autonomous self-repair (approximately 2 min), compared with A0.

The bis-urea 5 of A'6 provides an increase in scratch resistance by autonomous self-repair (approximately 3 min), compared with A'0.

Similar tendencies are observed between the two groups of measurements "titration 21" and "titration 22", with better scratch resistance for the first one cited.

Figure 2:
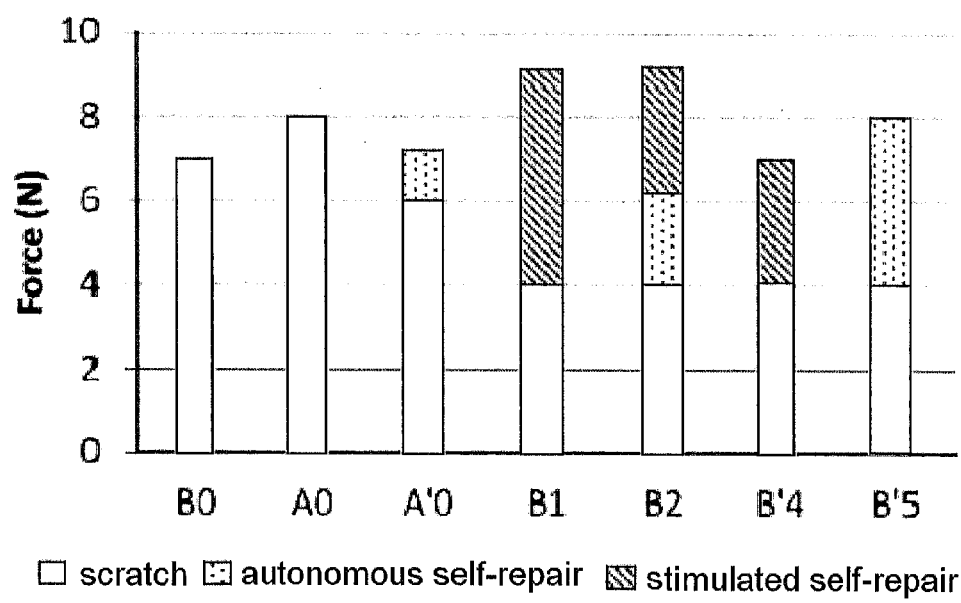
FIG. 2 shows the scratch resistance of layers under wet conditions according to an embodiment of the invention.

The scratch resistance under wet conditions, of the layers formed partly from Desmodur W diisocyanate, is now evaluated, still using the Erichsen test. The results are recorded in the histogram represented in FIG. 2.

An improvement in scratch resistance is observed when 10 mol % of the diols consist of bis-urea: the appearance of scratches appears at a lower value of the applied force in the Erichsen test, but there is self-repair of the scratches up to a higher value of this force than the value of appearance of scratches in the absence of bis-urea.

The use of bis-urea 1 in B1 provides a stimulated self-repair (approximately 3 min).

The use of bis-urea 4 in B2 provides an autonomous self-repair (more than 2 min) and then a stimulated self-repair.

The scratch resistance, under dry conditions, of the hydrophilic layers formed without diisocyanate is better than the scratch resistance, under wet conditions, of the hydrophilic layers for which a part of the triisocyanate has been replaced with diisocyanate (comparison B0/A0, B1/A1, B2/A2, B'4/A'4, B'5/A'5).

The scratch resistance is again better for the titration 21 tests than for the titration 22 tests.

In a second series of tests, a part of the PEG is replaced with the trifunctional polypropylene ether polyol sold by the company Bayer under the tradename Desmophen® 1380 BT. The composition of the formulations is reported in the table below.

TABLE 3

| Formulation | Reagents | | | |
|---|---|---|---|---|
| | Desmodur N3200 (mol %) | PPG Desmophen (mol %) | PEG (mol %) | Bis-urea 4 (mol %) |
| Thickness 40 μm | NCO titration 22 | | | |
| Reference C0 | 100 | 40 | 60 | |
| C1 | 100 | 35 | 55 | 10 |
| C2 | 100 | 34 | 51 | 15 |

Figure 3:
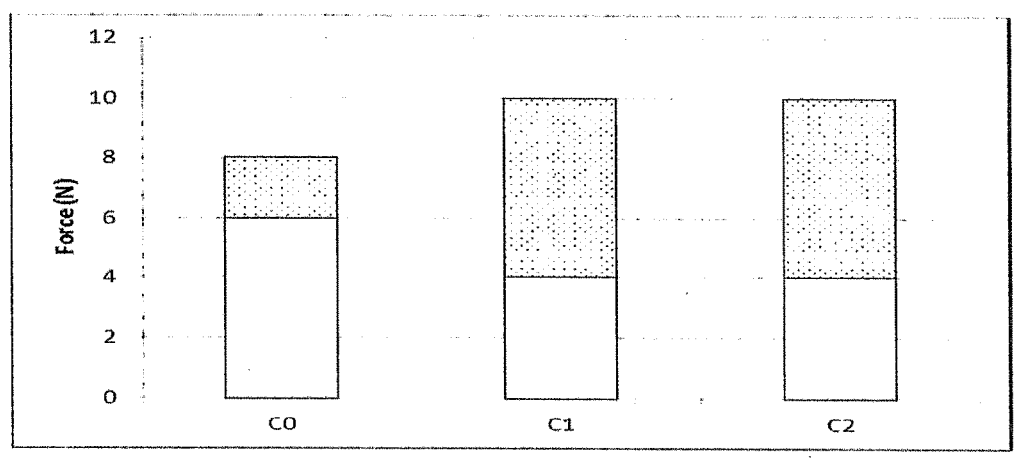
FIG. 3 shows the scratch resistance of layers of different formulations according to an embodiment of the invention.

The scratch resistance results are recorded in appended FIG. 3. It is again observed that a bis-urea content increases the scratch resistance by autonomous self-repair.

The invention claimed is:

1. A glazing unit comprising a hydrophilic layer comprising a polyurethane network, the polyurethane network incorporating bis-urea functions;
   wherein the bis-urea functions are incorporated into the polyurethane network via at least one isocyanate, at least one polyol and a diol-containing bis-urea monomer; and
   wherein hydroxyl functions of the bis-urea monomer represent 1 to 25 mol % of the hydroxyl functions of the at least one polyol and the diol-containing bis-urea monomer.

2. The glazing unit as claimed in claim 1, wherein the hydrophilic layer contains polyvinylpyrrolidone.

3. The glazing unit as claimed in claim 1, wherein the hydrophilic layer contains a film-forming agent.

4. The glazing unit as claimed in claim 3, wherein the film-forming agent contains at least one polydimethylsiloxane.

5. The glazing unit as claimed in claim 3, wherein the hydrophilic layer contains at least 75% to 99% by weight of polyurethane, 1% to 15% by weight of polyvinylpyrrolidone, and 0.01% to 3% by weight of film-forming agent.

6. The glazing unit as claimed in claim 2, wherein the weight-average molecular weight of the polyvinylpyrrolidone is from $1.1 \times 10^6$ to $1.8 \times 10^6$ g/mol.

7. The glazing unit as claimed in claim 1, wherein the hydrophilic layer has a thickness of between 0.1 and 250 μm.

8. The glazing unit as claimed in claim 1, wherein the hydrophilic layer is connected to a glass substrate with interposition of an adhesion primer which contains at least one aminosilane.

9. The glazing unit as claimed in claim 4, wherein the at least one polydimethylsiloxane is modified with a polyester.

10. The glazing unit as claimed in claim 9, wherein the polyester comprises a hydroxyl function.

11. The glazing unit as claimed in claim 7, wherein the thickness is between 1 and 100 μm.

12. The glazing unit as claimed in claim 11, wherein the thickness is between 3 and 50 μm.

13. The glazing unit as claimed in claim 1, wherein the hydroxyl functions of the bis-urea represent 3 to 22 mol % of the hydroxyl functions of of the at least one polyol and the diol-containing bis-urea monomer.

14. A process for manufacturing a glazing unit comprising a hydrophilic layer as claimed in claim 1, the process comprising:
   a) depositing a solution containing at least one isocyanate, one polyol and one bis-urea comprising a polyol function, polyvinylpyrrolidone, a film-forming agent and a solvent on a glass substrate,
   b) drying the glazing unit containing the substrate and the deposited solution, and
   c) subjecting the glazing unit to a temperature of between 100 and 150° C.

15. The process as claimed in claim 14, wherein the isocyanate is chosen from hexamethylene- 1,6-diisocyanate, an oligomer or a homopolymer thereof, and a cyclic aliphatic diisocyanate, alone or as a mixture of several of them.

16. The process as claimed in claim 14, wherein the polyol is chosen from polyethylene glycols, polypropylene ether polyol and 1,4-butanediol, alone or as a mixture of several of them.

17. The process as claimed in claim 14, wherein the solution contains a catalyst.

18. The process as claimed in claim 14, wherein the solution has an [NCO]/[OH] molar ratio of between 0.7 and 1.3.

19. A transportation vehicle, an interior fitting, a mirror, or an electrical good comprising the glazing unit according to claim 1.

20. The process as claimed in claim 17, wherein the catalyst is dibutyltin dilaurate.

21. The process as claimed in claim 18, wherein the molar ratio is between 0.8 and 1.15.

22. The method as claimed in claim 19, wherein the transportation vehicle is an electric vehicle.

* * * * *